(12) United States Patent
Osmond et al.

(10) Patent No.: US 8,176,319 B2
(45) Date of Patent: May 8, 2012

(54) IDENTIFYING AND ENFORCING STRICT FILE CONFIDENTIALITY IN THE PRESENCE OF SYSTEM AND STORAGE ADMINISTRATORS IN A NAS SYSTEM

(75) Inventors: Roger F. Osmond, Littleton, MA (US); Gil Goren, Ashland, MA (US)

(73) Assignee: EMC Corporation, Hopkinton, MA (US)

( * ) Notice: Subject to any disclaimer, the term of this patent is extended or adjusted under 35 U.S.C. 154(b) by 872 days.

(21) Appl. No.: 11/426,645

(22) Filed: Jun. 27, 2006

(65) Prior Publication Data

US 2007/0300062 A1 Dec. 27, 2007

(51) Int. Cl.
H04L 29/06 (2006.01)
(52) U.S. Cl. .......... 713/165; 726/2; 726/3; 726/26; 726/28
(58) Field of Classification Search ............. 713/165
See application file for complete search history.

(56) References Cited

U.S. PATENT DOCUMENTS

| | | | |
|---|---|---|---|
| 5,940,507 A | 8/1999 | Cane et al. | |
| 6,134,660 A * | 10/2000 | Boneh et al. | 713/193 |
| 6,381,644 B2 * | 4/2002 | Munguia et al. | 709/225 |
| 6,598,167 B2 * | 7/2003 | Devine et al. | 726/8 |
| 7,406,596 B2 * | 7/2008 | Tararukhina et al. | 713/165 |
| 7,707,642 B1 * | 4/2010 | Herbach et al. | 726/27 |
| 2001/0047421 A1 * | 11/2001 | Sridhar et al. | 709/230 |
| 2002/0032873 A1 * | 3/2002 | Lordemann et al. | 713/201 |
| 2002/0091975 A1 * | 7/2002 | Redlich et al. | 714/699 |
| 2002/0166053 A1 * | 11/2002 | Wilson | 713/189 |
| 2003/0021417 A1 * | 1/2003 | Vasic et al. | 380/277 |
| 2003/0056095 A1 * | 3/2003 | Elliott et al. | 713/164 |
| 2003/0084280 A1 * | 5/2003 | Bryan et al. | 713/153 |
| 2003/0105830 A1 * | 6/2003 | Pham et al. | 709/216 |
| 2003/0126434 A1 * | 7/2003 | Lim et al. | 713/164 |
| 2003/0163705 A1 * | 8/2003 | Richards et al. | 713/182 |
| 2003/0212886 A1 * | 11/2003 | Sugiura | 713/150 |
| 2004/0010699 A1 * | 1/2004 | Shao et al. | 713/189 |
| 2004/0054893 A1 * | 3/2004 | Ellis | 713/165 |
| 2004/0151308 A1 * | 8/2004 | Kacker et al. | 380/30 |

(Continued)

OTHER PUBLICATIONS

Riedel et al., "A framework for evaluating storage system security", Jan. 2002, USENIX Association, Proceedings of the 1st USENIX Conference on FAST '02, Article 2.*

(Continued)

*Primary Examiner* — Taghi Arani
*Assistant Examiner* — Kenneth Chang
(74) *Attorney, Agent, or Firm* — Krishnendu Gupta; Joseph D'Angelo

(57) ABSTRACT

A data storage architecture for networked access by clients includes a file server capable of communication with the clients via the network, physical storage organized as a plurality of logical volumes, and an encryption device in communication with both the file server and the physical storage. The encryption device is operable in response to signaling from the file server to cause encryption of data being moved into the physical storage, and decryption of data being retrieved from storage. Two logical paths are provided for I/O operations. A first path is reserved for use by a first type of requestor, such as file owners. Data retrieved via the first path is decrypted by the encryption device, and Writes via the first path are allowed. A second path is employed for others than the owners, e.g., administrators. Data retrieved via the second path is not decrypted by the encryption device, and attempted Writes via the second first path are denied. Metadata may be delivered in-the-clear via both paths in response to a Read so that legitimate management tasks can be performed.

24 Claims, 5 Drawing Sheets

U.S. PATENT DOCUMENTS

| | | | |
|---|---|---|---|
| 2004/0153642 A1* | 8/2004 | Plotkin et al. | 713/150 |
| 2005/0078822 A1* | 4/2005 | Shavit et al. | 380/201 |
| 2005/0144468 A1* | 6/2005 | Northcutt et al. | 713/189 |
| 2005/0193235 A1* | 9/2005 | Sandorfi et al. | 714/6 |
| 2005/0262573 A1 | 11/2005 | Bo et al. | |
| 2005/0268114 A1 | 12/2005 | Thibadeau | |
| 2006/0015945 A1 | 1/2006 | Fields | |

OTHER PUBLICATIONS

Mont et al., "The HP time vault service: exploiting IBE for timed release of confidential information", May 2003, ACM, Proceedings of the 12th international conference on WWW, pp. 160-169.*

* cited by examiner

SIMPLIFIED LOGIC FLOW IN SERVER

| BIT BYTE | 7 | 6 | 5 | 4 | 3 | 2 | 1 | 0 |
|---|---|---|---|---|---|---|---|---|
| 0 | OPERATION CODE = 28h ||||||||
| 1 | LUN ||| DPO | FUA | RESERVED || RelAclr |
| 2 | Msb<br>LBA ||||||||
| 3 | ||||||||
| 4 | ||||||||
| 5 | Lsb ||||||||
| 6 | RESERVED ||||||||
| 7 | Msb<br>TRANSFER LENGTH ||||||||
| 8 | Lsb ||||||||
| 9 | CONTROL ||||||||

SCSI 10 BYTE READ COMMAND (28h)

FIG. 4

| BIT BYTE | 7 | 6 | 5 | 4 | 3 | 2 | 1 | 0 |
|---|---|---|---|---|---|---|---|---|
| 0 | OPERATION CODE = 3Eh ||||||||
| 1 | LUN ||| RESERVED ||| CORRCT | RelAclr |
| 2 | Msb |||||||  |
| 3 | LBA ||||||||
| 4 | ||||||||
| 5 | |||||||Lsb |
| 6 | RESERVED ||||||||
| 7 | Msb | TRANSFER LENGTH |||||||
| 8 | |||||||Lsb |
| 9 | CONTROL ||||||||

SCSI 10 BYTE READ LONG COMMAND (3Eh)

FIG. 5

IDENTIFYING AND ENFORCING STRICT FILE CONFIDENTIALITY IN THE PRESENCE OF SYSTEM AND STORAGE ADMINISTRATORS IN A NAS SYSTEM

FIELD OF THE INVENTION

This invention relates generally to the field of data storage, and more particularly to encrypted data storage.

BACKGROUND OF THE INVENTION

Protection of confidential information may be more difficult than ever before because of the proliferation of networked computing devices. Comprehensive protection of information stored in computer-readable form should include identity management, authorization/authentication, data integrity assurance, proper logging/auditing, i.e., to ensure chain of custody, and a guarantee of confidentiality. Data encryption is part of most protection regimes. Data encryption can be employed for data in-flight and for data at rest. Data in-flight encryption is especially valuable for data that leaves the relatively safer and more secure "behind the firewall" environment. Data in-flight has received significant attention, and there are many commercially available products. Data at rest has received less attention. Recently, there have been some highly publicized incidents in which data at-rest in the form of backups on tapes have been lost or otherwise compromised. This publicity has lead to increased demand for devices that can encrypt data at rest on tape. However, the threat to data at rest may actually be greater when it is stored on disk than on tape. This is because the on-disk data is more current, and therefore more valuable. Further, the data on-disk is more likely to be accessible via a network, and a greater number of individuals are likely to have access to the data, whether rightfully or not.

One vulnerability of known encryption schemes is the "super user problem." In order to maintain a network and storage system, network administrators and storage administrators are typically provided with unrestricted access to files. Further complicating matters, file servers typically provide a means by which remote users with administrator privileges, a.k.a. "super users," are granted the equivalent of local administrator access. Since the remote administrator is granted local administrator privileges, that remote administrator can have full and unencumbered access to metadata and data, regardless of defined file or directory ownership and permissions. UNIX and Linux systems have a mechanism by which to treat remote "root" users as if they were local. This capability is also common to dedicated NAS servers. This mechanism also makes it possible for administrators to subvert or circumvent permissions and other access controls. Such access is a significant compromise to confidentiality. However, it is also necessary for the super-users to perform legitimate administrative functions on networked resources, perhaps remotely, so the super user cannot simply be eliminated.

SUMMARY OF THE INVENTION

In accordance with one embodiment of the invention, data storage apparatus available to at least one requester via a network, comprises: a file server capable of communication with the client via the network; physical storage; and an encryption device in communication with both the file server and the physical storage; wherein first and second logical paths are established between the file server and the physical storage, by way of the encryption device, the first path being employed for a first type of requester and the second path being employed for a second type of requester, and wherein the encryption device is operative to provide decrypted data to the file server via the first path, and to provide encrypted data to the file server via the second path.

In accordance with another embodiment of the invention, a method for managing data storage available to at least one requester via a network, comprises the steps of: in response to a request from a first type of requester, providing decrypted data to the requester via a first logical path; and in response to a request from a second type of requester, providing encrypted data to the requester via a second logical path.

One advantage of the invention is preserving data confidentiality with regard to super users while retaining the capability to perform legitimate administrative functions. In particular, by providing an administrator with access to unencrypted metadata and only encrypted data for a confidential record, most legitimate administrative functions can be performed without compromising the confidentiality of the data. Another advantage is a file server that supports encryption without need for knowledge of the encryption keys, and without foregoing services typically restricted by use of encryption.

BRIEF DESCRIPTION OF THE FIGURES

FIGS. 4 and 5 illustrate SCSI command description blocks for implementing dual path Write and Read operations.

DETAILED DESCRIPTION

Figure 1:
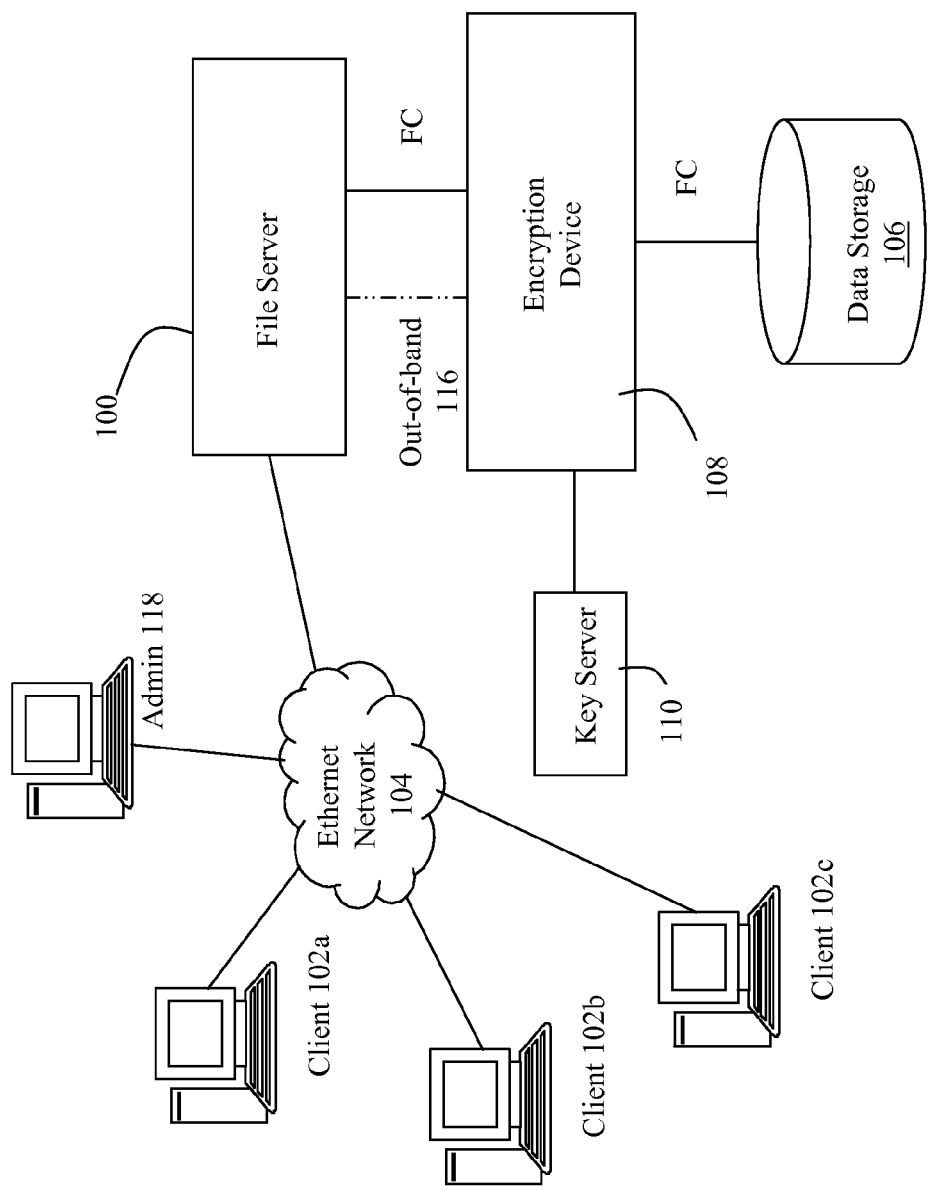
FIG. 1 illustrates a storage architecture operable to use block maps to enable intelligent encryption.

Referring to FIG. 1, a storage architecture includes a file server (100) in communication with clients (102a, 102b, 102c) via a local area network (104) using a first protocol such as Ethernet. In the case where the architecture is isolated from wider area networks by a firewall, data transmitted between the file server and clients may be "in the clear," i.e., not encrypted. The file server (100) is also in communication with, and possibly embedded with, a RAID group storage array (106) via an encryption device (108) using a second protocol such as Fibre Channel ("FC"). The encryption device (108) is in communication with a key server (110) which operates to provide the encryption keys. The encryption device utilizes the encryption keys to selectively encrypt data being moved into storage in the data storage (106), and also utilizes the encryption keys to selectively decrypt data being delivered from the data storage (106). Operation of the storage architecture may be in accordance with co-pending U.S. patent application Ser. No. 11/426,641, entitled ACHIEVING STRONG CORRELATION BETWEEN HIGHER LEVEL SEMANTIC UNITS AND LOWER LEVEL COMPONENTS IN A DATA STORAGE SYSTEM, filed contemporaneously with this application, by the same inventors, which is incorporated by reference. Various enhancements to the storage architecture may be implemented to facilitate ownership enforcement to protect against, among other things, the super user problem. One aspect of a solution to the super user problem is prohibiting remote admins from gaining super user privilege for confidential NAS data. The file server can be configured to enforce this behavior at a level of granularity matching the unit of protection (e.g., file system, file, partial file), and do so regardless of any export options.

Figure 2:
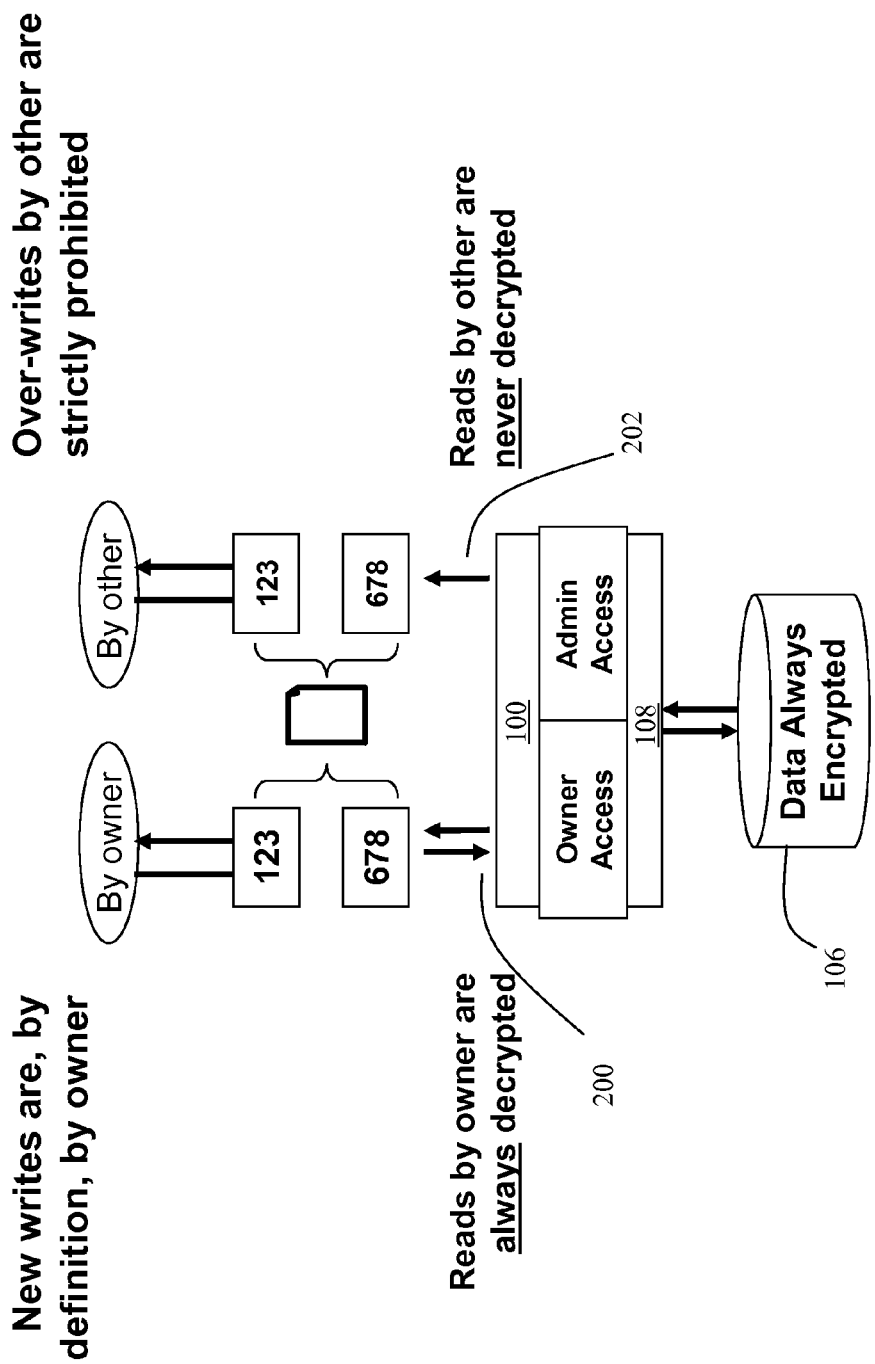
FIG. 2 illustrates dual path Write and Read operations.

Referring to FIG. 2, in one embodiment of the invention two alternate paths (200, 202) are provided for I/O operations associated with the data storage (106). Confidential data in data storage is always encrypted. One I/O path (200) is reserved for the file owner, or group of owners, where ownership in this sense equates to a normal user with appropriate permissions, and excludes users acting with special privileges resulting from a super-user mechanism. Data retrieved via the file owner path (200) is always decrypted. The second path (202) is available to "others" than the owner, such as super-users. Data retrieved via the second path (202) is never decrypted. The actual data on disk is the same regardless of path, the only difference is in the decryption policy. Write accesses by others are explicitly denied in all cases. Overwrites by others constitute a breach of security with respect to chain of custody and data integrity, and are as such denied. When a read-by-other occurs, the file server signals an indication to the encryption device. This signaling may be done in-band because of problems such as high latency and race conditions that might be encountered with signaling out-of-band. The encryption device is operative in response to the signaling of a read-by-other to provide the data in encrypted form. Naturally, the others authorized to receive the encrypted data may also be qualified in some way.

Figure 3:
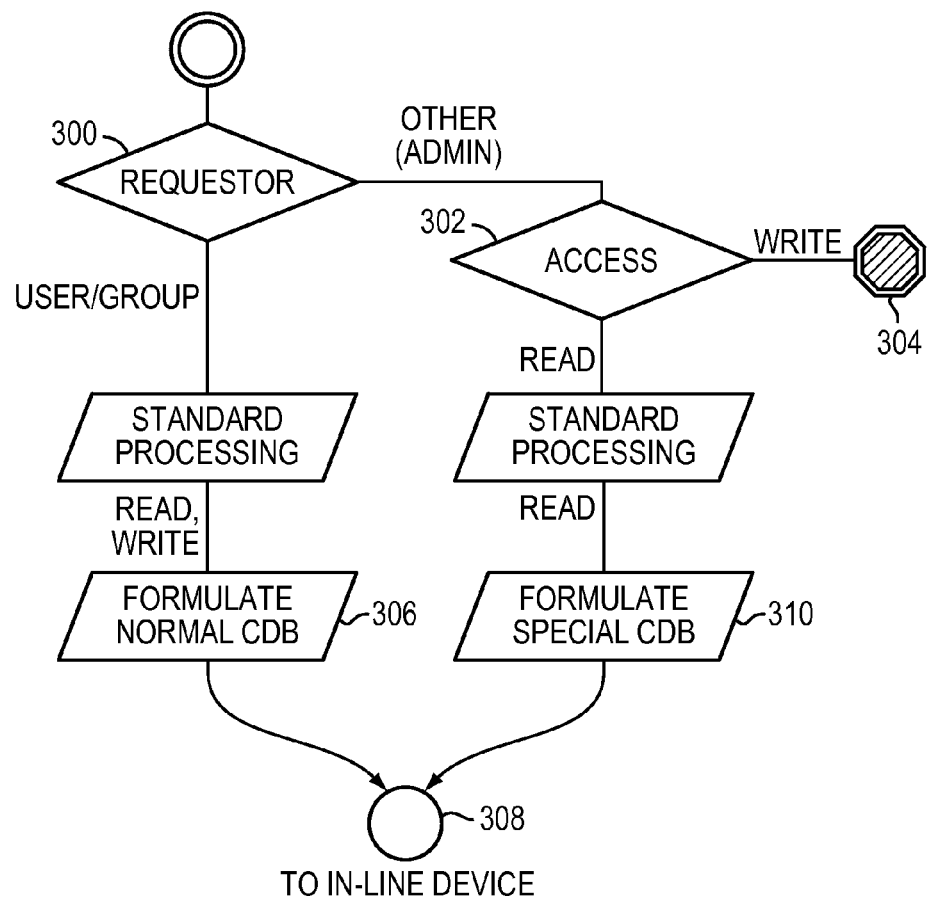
FIG. 3 is a flow diagram of dual path Write and Read operations.

FIGS. 3-5 illustrate a technique for implementing the alternate paths (200, 202). In an initial step (300), the I/O requester is identified as being either an owner or other. If the requester is the owner, a command description block ("CDB") such as that illustrated in FIG. 4 is generated as indicated by step (306). The OP Code field (400) is employed to designate whether the request is a Read or Write by owner. The generated CDB is then sent to the encryption device as indicated in step (308), and described in greater detail in ACHIEVING STRONG CORRELATION BETWEEN HIGHER LEVEL SEMANTIC UNITS AND LOWER LEVEL COMPONENTS IN A DATA STORAGE SYSTEM. If the requestor is identified as other, e.g., admin, in step (300), then the nature of the access request is determined in step (302). If the access is determined to be an attempted Write operation then the access is denied as shown in step (304). If the access is determined to be an attempted Read operation then a special CDB such as that illustrated in FIG. 5 is formulated as shown in step (310), and sent to the encryption device in step (308). A special code (500) in the OP Code field is used to instruct the encryption device to refrain from decrypting the data. Consequently, the data is delivered to the file server in encrypted form. New Writes, i.e., Writes to a new file, are by definition by owner. Overwrites, i.e., Writes to an existing file, are not permitted by others and are rejected in the file server itself when adhering to the strict ownership model. Deletes are handled in the file server, without the need for messages to the storage or encryption devices.

In one embodiment the metadata describing the data is delivered to other in-the-clear. Encrypting metadata causes complications which are generally known. Further, permitting admin access to metadata is generally less risky with regard to confidentiality than permitting access to the data itself, and enhances the ability of the admin to perform legitimate management tasks. Because operations such as Read by other may deliver encrypted data and metadata in-the-clear, it may be desirable to separately process data and metadata. Data/metadata separation can be accomplished by creating separate block ranges for the metadata and designating them as "not confidential," and thereby avoiding encryption. It is possible in this manner to obviate the need for a separate LUN for metadata. However, this technique is effective only if the metadata block ranges are separate from the data ranges and each relatively contiguous. If the server already uses a separate LUN for metadata then leaving metadata in clear text is simply a matter of not encrypting the metadata LUNs.

Since occasions may arise where it is actually desirable for someone other than the owner to obtain access to the data in-the-clear, provision may be made to enable decryption by other in extraordinary circumstances. This authority might be withheld from system administrators and even storage administrators, and reserved for an information security specialist or other designated individual. This enhancement could be implemented by changing ownership of a file. It can also be done by building in a group-level Read permission, where the only members of this elite group would be the security specialists. System administrators and other super-users would not be allowed into this group, and would not be allowed to "su" to become members of this group.

In another alternative embodiment access control is extended to controlling access to content based on the location of the content and on the time of access. Location-based controls might be as strict as within a single building, or even a part of a building. They could be broader, possibly to support off-shore development, or even country-specific licensing. Time-based controls could be used to impose time-limited access to executables, or to time-sensitive information. They could also be used at very fine granularity to limit exposure risks. A specific client could be granted access to specific information in a possibly very small window. Dynamically generated information could be a good candidate for this kind of control. Complying with file protocols means that Reads, Writes and Executes would be as before, but the contents of the files, if limited by these other factors, would remain encrypted.

In another alternative embodiment the architecture supports a multi-path file system. This embodiment separates data access from metadata access in order to offload the file server from the bulk of the I/O load. Clients equipped with the proper agent software and FC hardware are able to read and write data directly from and to the storage device. They can do this because they have received "permission" to do so from the actual file server. Included in the "permission" is a map of the blocks relating to the file and the I/O range in particular. This is the kind of information needed to empower the encryption device to compartmentalize the encrypted data in the storage it presents.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. Data storage apparatus available to at least one requestor via a network, comprising:
  a file server capable of communication with at least one client via the network;
  physical storage comprising LUNs; and
  an encryption device in communication with both the file server and the physical storage; wherein the encryption device is not in direct communication with the client; wherein the encryption device is communicatively coupled to a key server which is enabled to provide the encryption device with encryption keys; wherein the clients are not in direct communication with the key server; wherein the encryption device is enabled to use the encryption keys to selectively decrypt data being delivered from the physical storage;

wherein first and second logical paths are established between the file server and the physical storage by way of the encryption device, the first path being employed for a first type of requestor, the first requestor corresponds to an owner of data being requested, and the second path being employed for a second type of requestor, wherein the second type of requestor is other than an owner of the data being requested, and wherein the physical storage is operative to provide decrypted data to the file server via the first path, and wherein the physical storage is operative to provide encrypted data and metadata in-the-clear stored on an unencrypted LUN of the LUNs, the metadata describing the data, to the file server via the second path.

2. The apparatus of claim 1 wherein the file server is operative to identify whether the requestor is first type or second type.

3. The apparatus of claim 1 wherein the second type of requestor is an administrator.

4. The apparatus of claim 2 wherein the file server signals to the encryption device to designate which of the first and second paths to utilize.

5. The apparatus of claim 1 wherein the file server is operative to permit Write operations via the first path, and to deny attempted Write operations via the second path.

6. The apparatus of claim 4 wherein the file server is operative to signal to the encryption device with a SCSI command description block, and to designate the appropriate path with an OP Code in the command description block.

7. The apparatus of claim 1 wherein the file server is further operative to prohibit super user privilege via remote access.

8. The apparatus of claim 1 wherein the file server is operative to prompt delivery of decrypted data in extraordinary circumstances.

9. The apparatus of claim 1 wherein the file server is further operative to control access to data based on location of the data and time of day of attempted access.

10. The apparatus of claim 1 wherein the file server is operative to permit a selected requestor to read and write data directly from and to the data storage apparatus, where the storage system includes the encryption device and any presented physical storage.

11. The apparatus of claim 10 wherein the file server is operative to provide the selected requestor with a block map indicating blocks resident on the physical storage describing a data file in storage.

12. A method for managing data storage available to at least one requestor via a network, the network having a client, physical storage comprising LUNs communicatively coupled to an encryption device that is communicatively coupled to a key server which is enabled to provide the encryption device with encryption keys, and a file server communicatively coupled to the encryption device, comprising the steps of:

in response to a request from a first type of requestor, wherein the first type of requestor is an owner of data being provided, providing decrypted data to the requestor via a first logical path; wherein first logical paths is established between the file server and the physical storage by way of the encryption device and wherein the encryption device is not in direct communication with the first requestor; wherein the requestor is not in direct communication with the key server; wherein the encryption device is enabled to use the encryption keys to selectively decrypt data being delivered from the physical storage; and in response to a request from a second type of requestor, wherein the second type of requestor is other than an owner of data being provided, providing encrypted data and metadata in-the-clear stored on an unencrypted LUN of the LUNs, the metadata describing the data, to the requestor via a second logical path; wherein second logical paths is established between the file server and the physical storage by way of the encryption device and wherein the encryption device is not in direct communication with the second requestor.

13. The method of claim 12 including a file server, and including the further step of the file server identifying whether the requestor is first type or second type.

14. The method of claim 13 wherein the second type of requestor is an administrator.

15. The method of claim 13 including the further step of the file server signaling to an encryption device logically disposed between the file server and storage, the signaling designating which of the first and second paths to utilize.

16. The method of claim 12 including the further step of the file server permitting Write operations via the first path, and denying attempted Write operations via the second path.

17. The method of claim 15 including the further step of the file server signaling to the encryption device with a SCSI command description block, and designating the appropriate path with an OP Code in the command description block.

18. The method of claim 12 including a file server, and the further step of the file server prohibiting super user privilege via remote access.

19. The method of claim 12 including a file server, and the further step of the file server prompting delivery of decrypted data in extraordinary circumstances.

20. The method of claim 12 including a file server, and the further step of the file server controlling access to data based on location of the data and time of day of attempted access.

21. The method of claim 12 including a file server, and the further step of the file server permitting a selected requestor to read and write data directly from and to a logical storage device.

22. The method of claim 21 including a file server, and the further step of the file server providing the selected requestor with block map indicating blocks on a device describing a data file in the logical storage device.

23. The apparatus of claim 1 wherein encryption device utilizes the encryption keys to selectively encrypt data being moved into storage in the data storage.

24. The method of claim 12 wherein encryption device utilizes the encryption keys to selectively encrypt data being moved into storage in the data storage.

* * * * *